US007861898B2

(12) United States Patent
Ophardt

(10) Patent No.: US 7,861,898 B2
(45) Date of Patent: Jan. 4, 2011

(54) PISTON CARRYING GUIDE TUBE

(75) Inventor: Heiner Ophardt, Vineland (CA)

(73) Assignee: Gotohti.Com Inc., Beamsville, Ontario (CA)

( * ) Notice: Subject to any disclaimer, the term of this patent is extended or adjusted under 35 U.S.C. 154(b) by 819 days.

(21) Appl. No.: 11/508,990

(22) Filed: Aug. 24, 2006

(65) Prior Publication Data

US 2007/0284394 A1 Dec. 13, 2007

(30) Foreign Application Priority Data

Jun. 13, 2006 (CA) .................................. 2549972

(51) Int. Cl.
*G01F 11/00* (2006.01)

(52) U.S. Cl. ................................ 222/321.7; 222/321.1

(58) Field of Classification Search .............. 222/321.1, 222/321.7, 321.8, 321.9, 181.1, 321.2, 321.3, 222/321.4, 321.5, 321.6
See application file for complete search history.

(56) References Cited

U.S. PATENT DOCUMENTS 4,458,832 A * 7/1984 Corsette .................. 222/321.7
5,165,577 A 11/1992 Ophardt
5,282,552 A 2/1994 Ophardt
5,489,044 A 2/1996 Ophardt
5,676,277 A 10/1997 Ophardt
5,975,360 A 11/1999 Ophardt
6,409,050 B1 6/2002 Ophardt et al.
6,446,840 B2 9/2002 Ophardt et al.
6,601,736 B2 8/2003 Ophardt et al.
6,666,355 B2 * 12/2003 Padar ...................... 222/321.9
6,851,583 B2 * 2/2005 Masuzzo et al. ......... 222/321.7
6,957,751 B2 10/2005 Ophardt
7,025,233 B2 * 4/2006 Masuda .................. 222/321.7

* cited by examiner

*Primary Examiner*—Kevin P Shaver
*Assistant Examiner*—Jonathan Wood
(74) *Attorney, Agent, or Firm*—Riches, McKenzie & Herbert LLP

(57) ABSTRACT

A piston pump is provided in which the piston-chamber forming member has a chamber within which a piston of a piston forming element is coaxially slidable. A locating member is provided on the piston forming element for engagement of the piston-chamber forming member externally of the chamber to assist the piston-chamber forming member and the piston forming element while sliding axially maintaining the piston centered and coaxial relative to the chamber.

17 Claims, 6 Drawing Sheets

PISTON CARRYING GUIDE TUBE

SCOPE OF THE INVENTION

This invention relates to piston pumps and, more particularly, to the guiding of the piston of the pump.

BACKGROUND OF THE INVENTION

Piston pumps are well known in which a piston is reciprocally movable in a chamber for pumping fluids. It is well known to provide a radially outwardly extending vane on a piston to extend outwardly and engage an internal chamber wall so as to guide the piston in coaxial alignment while sliding within the chamber. The present inventor has appreciated that previously known vanes suffer the disadvantage that they must avoid sealing discs provided in the piston and typically cannot extend axially of the piston for the entire length of the piston.

SUMMARY OF THE INVENTION

To at least partially overcome these disadvantages of previously known devices, the present invention provides a pump with a cylindrical piston chamber bounded by a chamber wall having a radially inwardly directed inner surface for engagement by the piston and with radially outwardly of the chamber wall a radially directed surface being provided which is coaxial with the chamber and engaged by a guide wall carried coaxially about the piston.

An object of the present invention is to provide a piston pump having an improved locating member for guiding the piston in coaxial sliding within a piston-chamber forming member.

In accordance with the present invention, a piston pump is provided in which the piston-chamber forming member has a chamber within which a piston of a piston forming element is coaxially slidable. A locating member is provided on the piston forming element for engagement of the piston-chamber forming member externally of the chamber to assist the piston-chamber forming member and the piston forming element while sliding axially maintaining the piston centered and coaxial relative to the chamber.

In one embodiment, the piston forming element carries a locating member which is located radially outwardly of the chamber wall, however, for engagement with radially directed surfaces of a guide wall carried on the piston-chamber forming member radially outwardly from the chamber wall.

In another embodiment, the piston forming member carries a chamber wall defining the chamber radially inwardly thereof and the chamber wall also has a radially outwardly directed surface. The piston forming element has a piston which slides axially within the chamber and, as well, has a locating member preferably in a form of the cylindrical guide wall which engages the radially outward surface of the chamber wall for coaxially guiding.

In accordance with the present invention, the piston received within the chamber preferably has one, two or more radially outwardly extending discs to engage an inner wall of the chamber and the locating member may comprise a cylindrical guide tube radially outwardly from such discs with a chamber wall on the piston-chamber forming member extending axially into an annular space between the discs on the piston and the cylindrical guide tube.

In one aspect, the present invention provides a pump for dispensing fluids from a reservoir, comprising:

a piston-chamber forming member having a chamber wall defining a cylindrical piston chamber therein disposed about an axis and bounded by a cylindrical, radially inwardly directed inner surface of the chamber wall, the chamber wall having a distal outer end defining an outer open end of the chamber, the chamber having an inner end in communication with the reservoir;

a piston forming element having a piston coaxially slidably received in the piston chamber with an axially extending stem having a distal inner end forming a piston within the piston chamber and with the stem extending outwardly from the open end of the piston chamber, the piston engaging the chamber wall to prevent fluid flow therepast at least one of inwardly and outwardly, a piston locating member secured to the stem axially outwardly from the disc, the piston locating member having a guide tube extending inwardly to a distal open inner end with the guide tube spaced radially outwardly of the stem and its disc, the chamber wall extending outwardly through the inner end of the guide tube with the chamber wall coaxially received within the guide tube, the guide tube having a coaxial cylindrical guide surface directed either radially inwardly or radially outwardly, the piston-chamber forming member carrying a coaxial cylindrical, guiding surface directed radially in opposed relation to the guide surface on the guide tube, the guide surface of the guide tube in coaxial, axially sliding engagement with the guiding surface of the piston-chamber forming member to guide the piston-chamber forming member and the piston forming element in sliding axially maintaining the piston centered and coaxially relative to the piston chamber.

In another aspect, the present invention provides a pump for dispensing fluids from a reservoir, comprising:

a piston-chamber forming member having a chamber wall defining a cylindrical piston chamber therein disposed about an axis and bounded by a cylindrical, radially inwardly directed inner surface of the chamber wall, the chamber wall having a distal outer end defining an outer open end of the piston chamber, the piston chamber having an inner end in communication with the reservoir;

the chamber wall having a cylindrical, radially outwardly directed outer guide surface, a piston forming element coaxially slidably received in the piston chamber extending outwardly from the open end thereof;

said piston forming element having an axially extending stem having a distal inner end forming a piston received in the chamber and engaging the chamber wall circumferentially thereabout to prevent fluid flow therepast at least one of inwardly and outwardly, a locating member secured to the stem axially outwardly of the piston, the locating member having a guide wall defining a coaxial cylindrical guide chamber therein bounded by a cylindrical, radially inwardly directed inner guide surface of the guide wall, the guide wall having a distal inner end defining an inner open end of the guide chamber, the chamber wall extending outwardly through the inner end of the guide chamber with the chamber wall coaxially received within the guide chamber with the inwardly directed inner guide surface of the guide wall in coaxial, axially sliding engagement with the outwardly directed outer guide surface the chamber wall to guide the piston-chamber forming member and the piston forming element in sliding axially maintaining the piston centered and coaxially relative to the piston chamber.

BRIEF DESCRIPTION OF THE DRAWINGS

Further aspects and advantages of the present invention will become apparent from the following description taken together with the accompanying drawings in which.

DETAILED DESCRIPTION OF THE DRAWINGS

Figure 1:
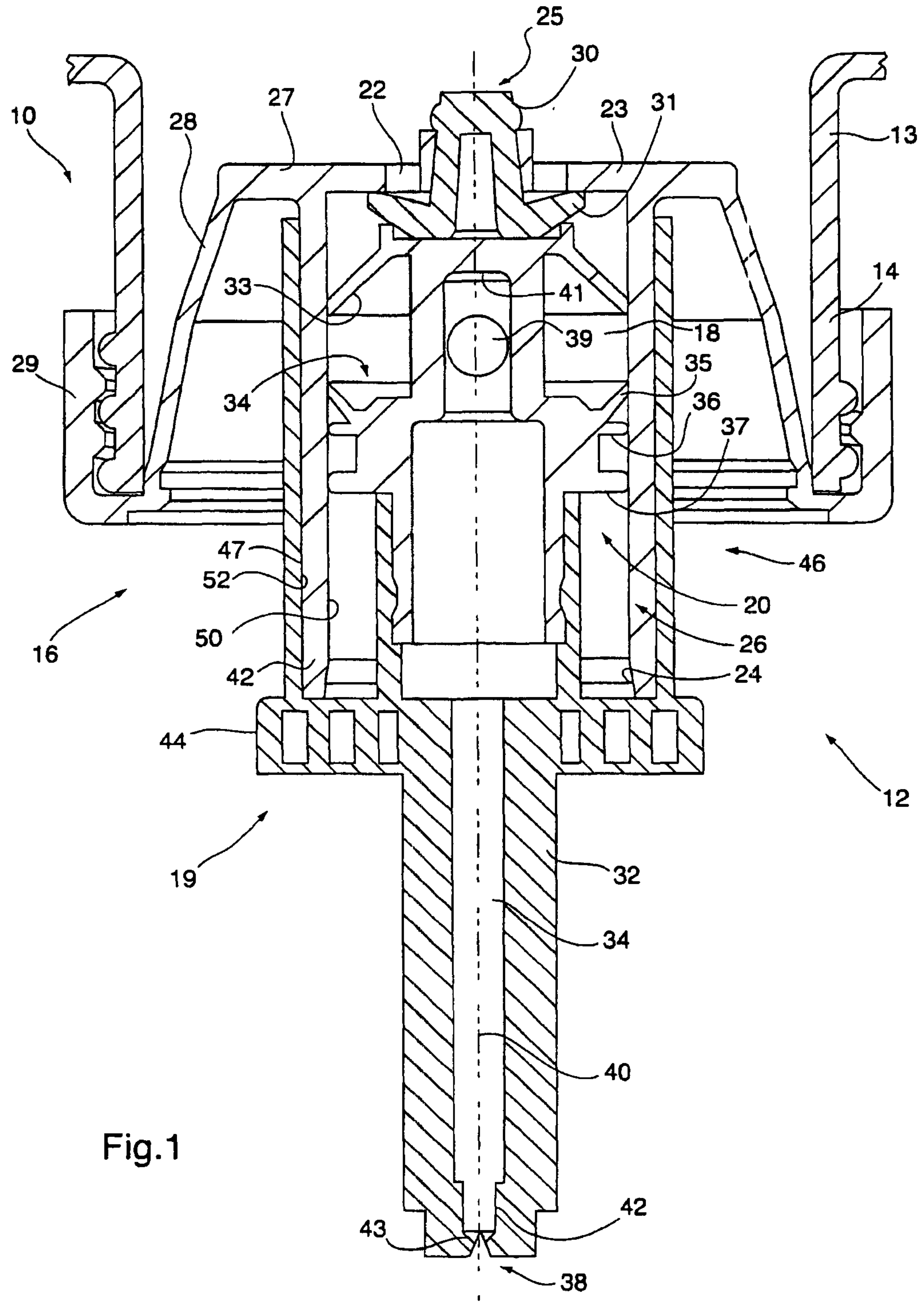
FIG. 1 is a schematic cross-sectional side view of a piston pump in accordance with a first embodiment of the present invention in a retracted position.
Figure 2:
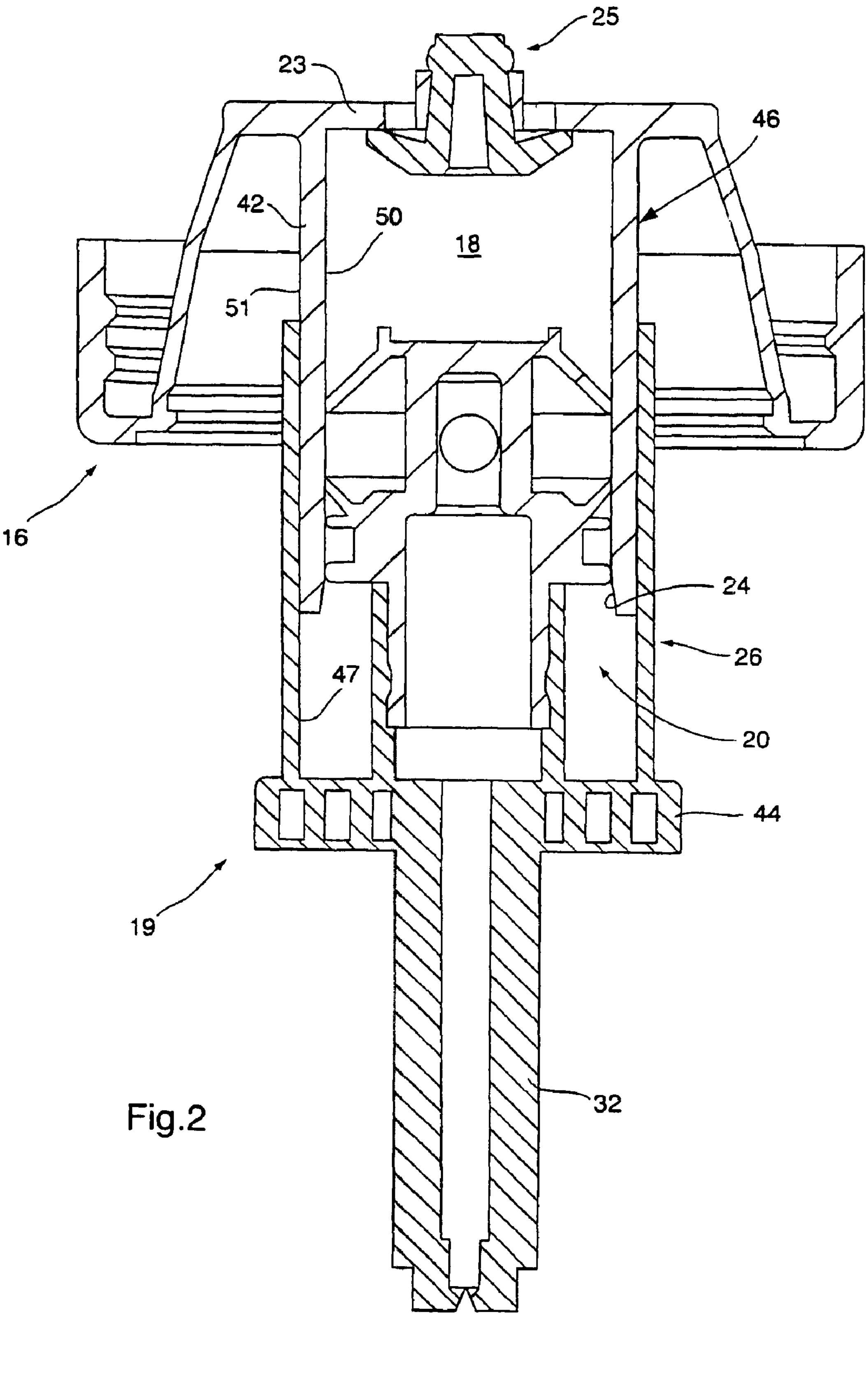
FIG. 2 is a view the same as in FIG. 1, however, with the piston in a retracted position.

Reference is made to FIGS. 1 and 2 which show a liquid dispenser 10 having a pump assembly 12 attached to a reservoir 13 in accordance with the present invention.

The reservoir 13 is a container with a threaded neck 14. The pump assembly 12 has a piston chamber-forming body 16 defining a chamber 18 therein in which a piston 20 of a piston forming element 19 is slidably disposed for reciprocal movement to dispense fluid from the reservoir. The piston chamber-forming body 16 has an annular end wall 23 with an inner tube 26 extending outwardly from the end wall 23 coaxially about a common axis 40. The inner tube 26 has a side wall 42 with radially inwardly directed inner surfaces 50 and radially outwardly directed outer surfaces 51. The chamber 18 is defined inside side wall 42 of the inner tube 26. The chamber 18 is closed at the inner end wall 23 and open at an outer end 24. Openings 22 in the end wall 23 of the chamber 18 are in communication with the fluid in the reservoir 13. Fluid from the reservoir 13 is in communication with the piston chamber 18 via the opening 22. A one-way valve 25 across the openings 22 permits fluid flow outwardly from the reservoir 13 into the chamber 18 but prevents fluid flow inwardly. The piston 20 of FIGS. 1 and 2 is reciprocally movable between a retracted position shown in FIG. 1 and an extended position shown in FIG. 2.

The piston chamber-forming body 16 has the cylindrical inner tube 26 defining the chamber 18 therein. An outer tubular member 28 is provided radially outwardly of the inner tube 26 joined by a radially extending shoulder 27 to the inner tube 26. The outer tubular member 28 carries a threaded flange 29 thereon which engages the threaded neck 14 of the reservoir 13 to form a fluid impermeable seal therewith.

The one-way valve 25 has a shouldered button 30 which is secured in a snap-fit inside a central opening in the end wall 23 of the chamber 18. A flexible annular rim 31 is carried by the button 30 and extends radially outwardly and axially inwardly into engagement with the end wall 23. When the pressure in the chamber 18 is less than that in reservoir 13, the rim 31 is deflected away from the end wall 23 and fluid may flow from the reservoir 13 through exit openings 22 in the end wall 23 and past the rim 31 into the chamber 18. Fluid flow in the opposite direction is blocked by rim 31, which is biased radially outwardly into the end wall 23.

The piston 20 has a hollow stem 32. Two discs 33 and 34 which are circular in cross section are located on the stem spaced from each other. An inner disc 33 resiliently engages the side wall of the chamber 18 to permit fluid flow outwardly therepast but prevents fluid flow inwardly. An outer disc 34 engages the side wall of the chamber 18 to prevent fluid flow outwardly or inwardly therepast. The outer disc 34 has 3 distinct disc portions, an inwardly angled disc portion 35, a middle ring portion 36 and an outer ring portion 37.

The piston stem 32 has a hollow passageway 34 extending along the axis 40 of the piston 20 from a blind inner end 41 to an outlet 38 at an outer end. Inlets 39 to the passageway 34 are provided between the inner disc 33 and outer disc 34. By reciprocal movement of the piston 20 in the chamber 18, fluid is drawn from reservoir 13 through exit openings 22 past the one-way valve 25 and via the inlets 39 to the passageway 41 and then through the passageway 41 to exit the outlet 38. The outlet 38 is provided in the form of a nozzle having a restricted diameter passageway 42 opening into an outwardly widening conical exit port 43.

A radially outwardly extending engagement flange 44 is provided on the stem 32 outward of the outer disc 34. A cylindrical guide tube 46 extends axially inwardly from the flange 44 disposed radially outwardly of the discs 33 and 34. The guide tube 46 has radially inwardly directed surfaces 47 which engage the outer surfaces 51 of inner tube 26 to cooperatively guide the piston forming element 19 relative the piston chamber-forming member 16 to maintain them coaxial and keep the piston 20 centered and coaxial within the chamber 18. As seen in the retracted position of FIG. 1, the entire axial extent of the guide tube 46 is overlies the inner tube 26. In the extended position of FIG. 2 the guide tube 46 overlies the inner tube 26 over a substantial axial extent.

Figure 3:
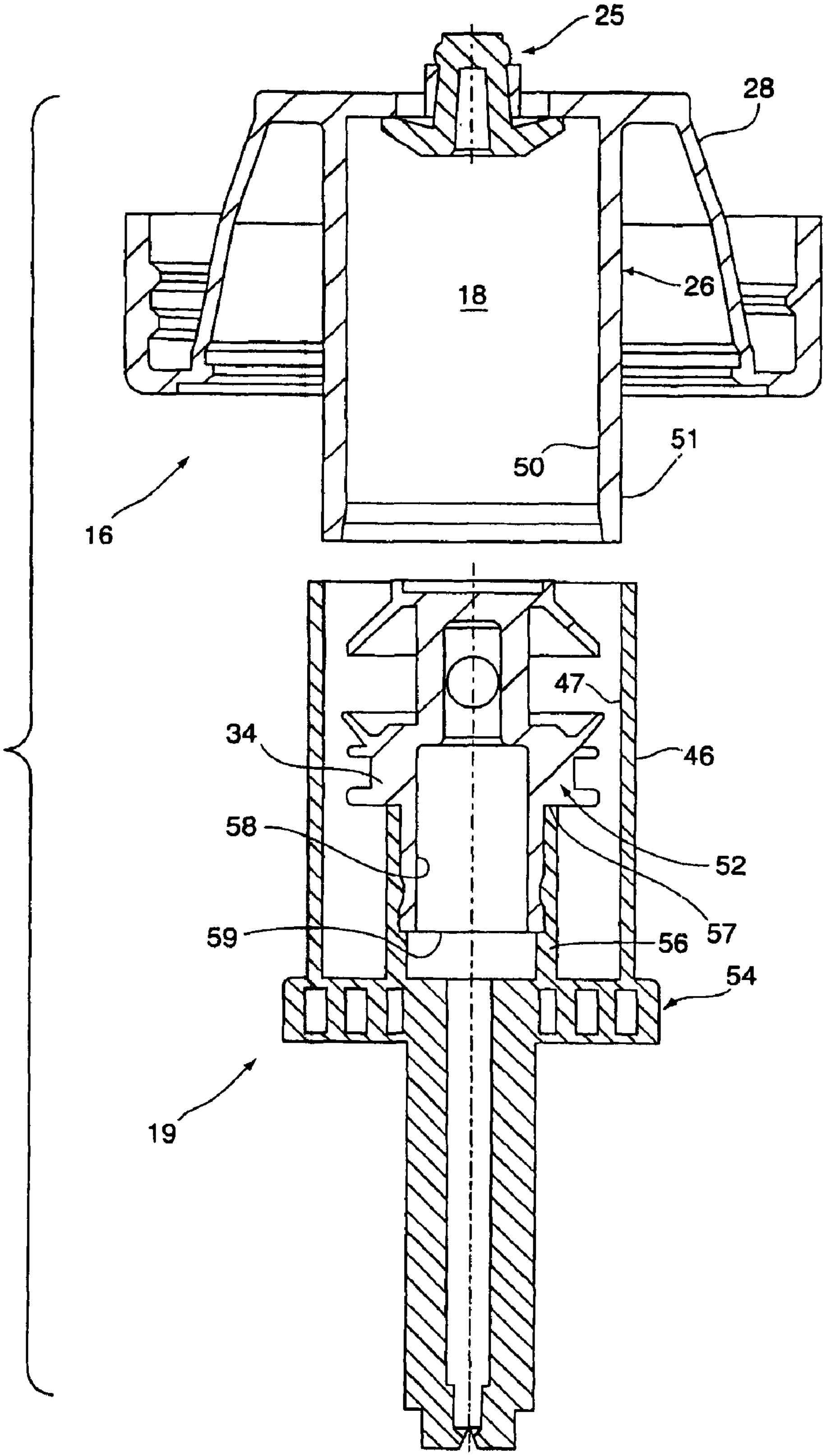
FIG. 3 is an exploded view of the piston pump of FIG. 1.

The piston chamber-forming body 16 is shown as a unitary element and preferably of plastic and manufactured by being injection moulded. The one-way valve 24 and the piston forming element 19 are separate elements. The piston-forming element 19, best seen in FIG. 3, has two elements, namely an piston head portion 52 and a piston body portion 54, with each preferably a unitary element preferably of plastic and manufactured by being injection moulded. The piston body portion 54 has a female tubular coupling portion 56 which extends inwardly from the flange 44 radially inside the guide tube 46 to an inner end 57. The piston head portion 52 has a male tubular coupling portion 58 which extends outwardly from the outer disc 34 to an outer end 59 which is fixedly secured inside the female tubular coupling portion 56 to retain the piston head portion 52 and a piston body portion 54 together.

FIG. 1 illustrates an embodiment where a single tube 46 provides both a cylindrical inner surface 50 for engagement by the piston 20 and a cylindrical outer surface 51 for engagement by the guide tube 46. This single tube 46 could be replaced by two coaxial tubes with an inner tube to carry inner surface 50 for engagement by the piston 20 and an outer tube to carry outer surface 51 for engagement by the guide tube 46.

Figure 4:
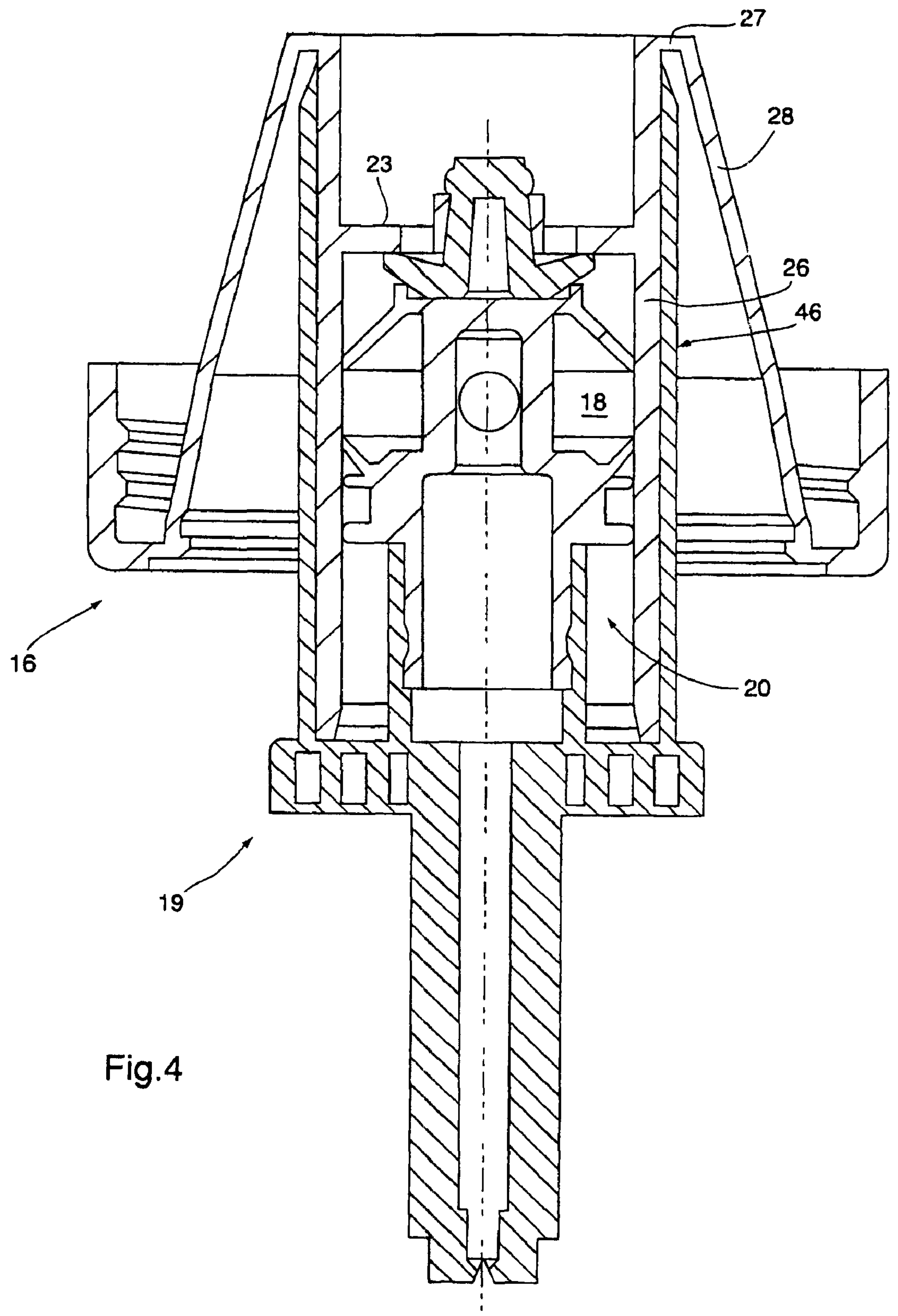
FIG. 4 is a schematic cross-sectional side view of a piston pump in accordance with a second embodiment of the present invention in a retracted position.

Reference is made to FIG. 4 which illustrates a second embodiment of a piston pump in accordance with this invention which is identical to the pump shown in FIG. 1 with the exception that the inner tube 26 has been extended inwardly past the end wall 23 of the chamber 18. In this regard, the radially extending shoulder 27 has been moved radially inwardly and the outer tubular member 28 has similarly been extended radially inwardly. The guide tube 46 on the piston forming element 19 has been increased in axial extent so as to provide an increased axial extent comparable to the axial extent of the inner tube 26. An advantage of the embodiment illustrated in FIG. 4 is that the guide tube 46 axially overlies the inner tube 26 over an axial extent greater than the extent that the piston 20 extends into the chamber 18. Thus, in a fully extended position similar to the position shown in FIG. 2, there will be an increased overlap of the guide tube 46 and the inner tube 26 thus providing for increased stability and coaxial alignment capability when in the extended position. As seen in FIGS. 1 and 2 in any position of the piston 20 in the chamber 18 the radially inwardly directed inner surface 47 of the guide tube 46 engages with the radially outwardly directed surface 51 of the inner tube 26 over an axial extent substantially equal to an axial extent that the stem 32 of the piston 20 extends into the chamber 18. The surface 51 extends axially inwardly from the outer end 24 of the chamber 18 an axial extent greater than the axial extent the outer disc 34 extends from the outer end 24 and at least equal to the axial extend the inner disc 33 extends from the outer end 24. As seen in FIGS. 1 and 4 the surface 51 extends axially from the outer end 24 at least substantially equal to the axial extent the surface 50 extends axially from the outer end 24.

Figure 5:
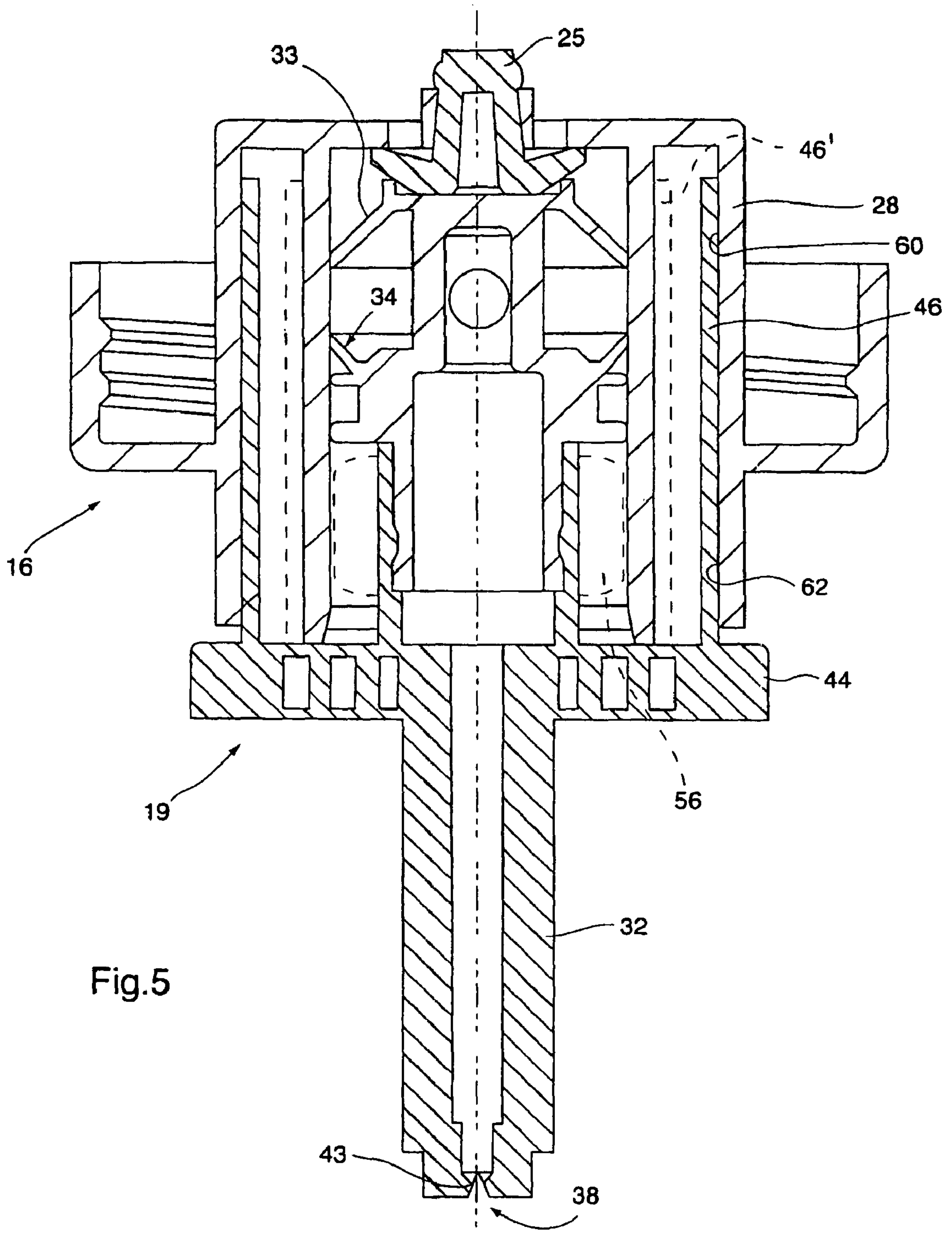
FIG. 5 is a schematic cross-sectional side view of a piston pump in accordance with a third embodiment of the present invention in a retracted position.

Reference is made to FIG. 5 which shows a third embodiment of a pump in accordance with the present invention which is identical to the first embodiment, however, the outer tubular member 28 radially outwardly of the inner tube 26 is provided with a generally cylindrical inwardly directed surface 60 and the guide tube 26 which extends inwardly on the engagement flange 44 is provided to have a radially outwardly directed generally cylindrical surface 62 to engage the inwardly directed surface 60 of the outer tube 28 rather than to engage the inner tube 26. As with the case of the embodiment shown in FIG. 1, an alternate embodiment could be configured in which the outer tubular member 28 extends inwardly beyond the end wall 23 and the guide tube 46 is similarly extended in length axially for an increased length of axial engagement.

FIG. 5 illustrates in dashed lines the location of the guide tube 46' in the embodiment of FIG. 1. It is to be appreciated that an embodiment as illustrated in FIG. 5 could be provided with two guide tubes, firstly, an outermost guide tube 46 as is illustrated in solid lines in FIG. 5 and, secondly, an inner guide tube indicated as 46' in dotted lines in FIG. 5. Further, various other locating coaxially guiding members may be provided on one or both of the piston forming element 19 or the piston-chamber forming member 16. In this regard, FIG. 5 is intended to locate in dotted lines axially extending radially outwardly directed vanes 56 which can be provided spaced about the stem 32 to engage the inner surface of the inner tube 26. As well, similar such vanes may be provided at other locations as between the inner disc 34 and the outer disc 35 and, as well, on an axially inwardly extending portion of the stem, not shown, which could be provided inwardly of the inner disc 33 and between the inner disc 33 and the one-way valve 25 in the case that the overall length of the chamber may be increased.

The preferred embodiments illustrate the piston forming element 19 as being formed from two elements. This is not necessary, however, can be an advantage in the context of a piston forming member of the type shown when a nozzle 43 is desired to be included. If a nozzle 43 is to be included, then it is expected that even if the piston forming element 19 is not to include the guide tube 26, that the piston forming element 19 would necessarily need to be made out of at least two elements to accommodate both the nozzle structure at one end and the closed end 41 at the inner end of the central passageway 34. In the context, therefore, of a piston forming element 19 which incorporates a nozzle 43, the present invention provides the advantage of also providing the guide tube 46 yet not requiring the piston forming element 19 to be formed from more than two components.

Vanes such as vanes 56 carried on the piston which extend internally of the inner tube 26 within the piston chamber 18 suffer the disadvantage that they have a limited axial extent. Moreover, such vanes are of greatest use when the inner surfaces of the inner tube 26 are cylindrical or at least cylindrical over the portions to be contacted by the vanes. Insofar as the inner surfaces of the inner tube 26 may be desired to have stepped configurations, such stepped configurations may reduce the effective axial length that the internal vane members may provide for engagement in useful guiding.

Figure 6:
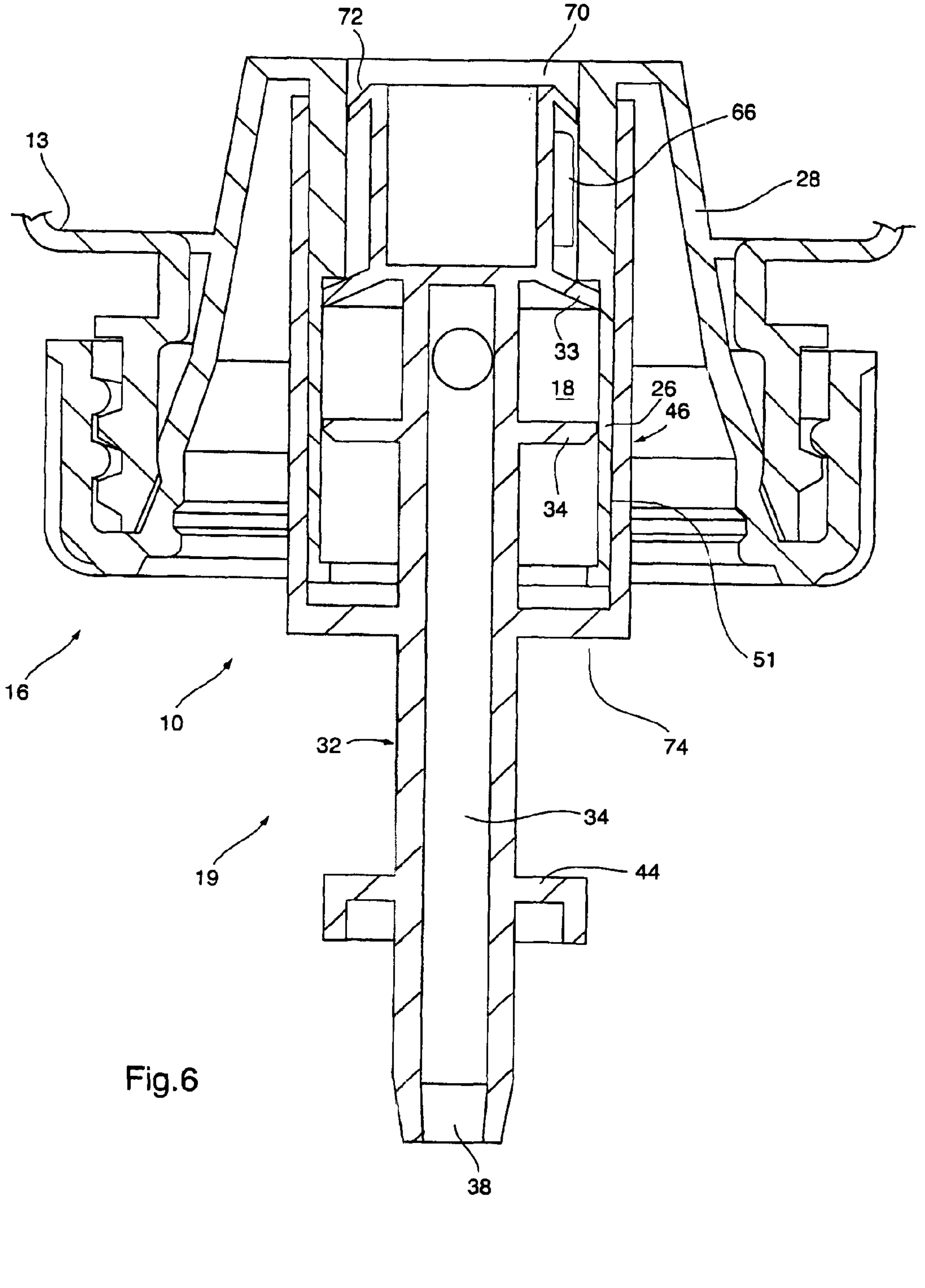
FIG. 6 is a schematic cross-sectional side view of a piston pump in accordance with a fourth embodiment of the present invention in a retracted position.

Reference is made to FIG. 6 which illustrates a piston pump in accordance with a fourth embodiment of the present invention in which similar reference numerals are used to refer to similar parts as in the other figures. In FIG. 6, the piston forming element 19 is shown as a unitary element carrying three discs. The piston chamber forming member 16 provides a stepped chamber having an outer chamber 18 and an inner chamber 70. The inner chamber 70 in combination with the additional innermost disc 72 eliminates the need for a separate one-way valve as was the case with the embodiments illustrated in FIGS. 1 to 5. As seen in FIG. 5, the guide tube 26 is carried by a support flange 74 which extends radially outwardly from the stem 32. The inner tube 26, while having stepped inner surfaces of different diameters, is shown as having a constant diameter outer surface. The outwardly directed outer surface, however, extends substantially the entire length of both the larger diameter outer chamber 18 and the smaller diameter inner chamber 70. Thus, coaxial guiding by engagement between the guide tube 46 and the inner tube 26 extends and continues over a greater axial extent than axially extending radial vanes such as 66 which may also provide on the piston 20 between the innermost disc 72 and the inner disc 33.

While the invention has been described with reference to the preferred embodiments, many modifications and variations will now occur to persons skilled in the art. For a definition of the invention reference is made to the following claims.

We claim:

1. A pump for dispensing fluids from a reservoir, comprising: a piston-chamber forming member having a chamber wall defining a cylindrical piston chamber therein disposed about an axis and bounded by a cylindrical, radially inwardly directed inner surface of the chamber wall, the chamber wall having a distal outer end defining an outer open end of the piston chamber, the piston chamber having an inner end in communication with the reservoir; the chamber wall having a cylindrical, radially outwardly directed outer guide surface, a piston forming element coaxially slidably received in the piston chamber extending outwardly from the open end thereof; said piston forming element having an axially extending stem having a distal inner end forming a piston received in the chamber and engaging the chamber wall circumferentially thereabout to prevent fluid flow therepast at least one of inwardly and outwardly, a locating member secured to the stem radially outwardly of the piston, the locating member having a guide wall defining a coaxial cylindrical guide chamber therein bounded by a cylindrical, radially inwardly directed inner guide surface of the guide wall, the guide wall having a distal inner end defining an inner open end of the guide chamber, the chamber wall extending outwardly through the inner end of the guide chamber with the chamber wall coaxially received within the guide chamber with the radially inwardly directed inner guide surface of the guide wall in coaxial, axially sliding engagement with the radially outwardly directed outer guide surface of the chamber wall to guide the piston-chamber forming member and the piston forming element in sliding axially, while maintaining the piston centered coaxially relative to the piston chamber, wherein in any position of the piston in the piston chamber, the radially inwardly directed inner guide surface of the guide wall engaging with the radially outwardly directed outer guide surface of the chamber wall over an axial extent substantially equal to an axial extent the piston extends into the piston chamber, and wherein the chamber wall forms an inner tube, the piston-chamber forming element including an outer tube spaced radially outwardly of the inner tube with the inner tube and outer tube coupled together proximate their inner ends providing an annular space therebetween open axially outwardly, the guide wall forming a guide tube coaxially received in the annular space.

2. A pump as claimed in claim 1 wherein the annular space extends inwardly beyond the inner end of the piston chamber, the radially inwardly directed inner guide surface of the guide wall engaging with the radially outwardly directed outer guide surface of the chamber wall inwardly beyond the inner end of the piston chamber.

3. A pump as claimed in claim 2 wherein in any position of the piston in the piston chamber, the radially inwardly directed inner guide surface of the guide wall engages with the radially outwardly directed outer guide surface of the chamber wall over an axial extent greater than an axial extent the piston extends into the piston chamber.

4. A pump as claimed in claim 1 wherein the outer tube carries radially outwardly of the annular space annular coupling surfaces for sealed coupling of the piston-chamber forming member to a mouth of the reservoir.

5. A pump as claimed in claim 1 wherein an annular connecting flange extends radially outwardly from the inner end of the inner tube to couple the inner tube to the outer tube.

6. A pump as claimed in claim 1 wherein the radially outwardly directed outer guide surface of the chamber wall extends axially inwardly from the distal outer end of the chamber wall an axial extent substantially equal to or greater than an axial extent the radially inwardly directed inner surface of the chamber wall extends axially inwardly from the distal outer end of the chamber wall.

7. A pump as claimed in claim 6 wherein: said piston forming element is generally cylindrical in cross-section with the stem comprising a central axially extending hollow stem having a central passageway open at an outer end forming an outlet and closed at the inner end; a circular head disc extending radially outwardly from the stem proximate the inner end, a circular base disc extending radially outwardly from the stem spaced axially outwardly from the head disc, the head disc having an edge portion proximate the chamber wall circumferentially thereabout engaging the chamber wall to prevent fluid flow therepast at least one of inwardly and outwardly; the base disc having an edge portion proximate the chamber wall circumferentially thereabout, the edge portion of the base disc engaging the chamber wall circumferentially thereabout to form a substantially fluid impermeable seal therewith on sliding of the piston forming element inwardly or outwardly, an inlet located on the stem between the head disc and the base disc in communication with the passageway via a short channel extending radially inwardly from the inlet to the passageway, the locating member secured to the stem radially outwardly of the head disc.

8. A pump as claimed in claim 7 further including: a one-way valve between the reservoir and the piston chamber permitting fluid flow through the inner end of the piston chamber, only from the reservoir to the piston chamber.

9. A pump as claimed in claim 1 wherein: said piston forming element is generally cylindrical in cross-section with the stem comprising a central axially extending hollow stem having a central passageway open at an outer end forming an outlet and closed at the inner end; a circular head disc extending radially outwardly from the stem proximate the inner end, a circular base disc extending radially outwardly from the stem spaced axially outwardly from the head disc, the head disc having an edge portion proximate the chamber wall circumferentially thereabout engaging the chamber wall to prevent fluid flow therepast at least one of inwardly and outwardly; the base disc having an edge portion proximate the chamber wall circumferentially thereabout, the edge portion of the base disc engaging the chamber wall circumferentially thereabout to form a substantially fluid impermeable seal therewith on sliding of the piston forming element inwardly or outwardly, an inlet located on the stem between the head disc and the base disc in communication with the passageway via a short channel extending radially inwardly from the inlet to the passageway, the locating member secured to the stem radially outwardly of the head disc.

10. A pump as claimed in claim 9 wherein in any position of the piston in the piston chamber, the radially outwardly directed outer guide surface of the chamber wall extends axially inwardly from the distal outer end of the chamber wall an axial extent greater than an axial extent that the base disc of the stem extends into the chamber axially inwardly from the distal outer end of the chamber wall.

11. A pump as claimed in claim 9 wherein in any position of the piston in the piston chamber, the radially outwardly directed outer guide surface of the chamber wall extending axially inwardly from the distal outer end of the chamber wall an axial extent at least equal to an axial extent that the circular head disc of the stem extends into the chamber axially inwardly from the distal outer end of the chamber wall.

12. A pump as claimed in claim 9 further including: a one-way valve between the reservoir and the piston chamber permitting fluid flow through the inner end of the piston chamber, only from the reservoir to the piston chamber.

13. A pump as claimed in claim 1 wherein the chamber wall forms an inner tube coaxial about the axis, and the guide wall forms a guide tube coaxially about the inner tube.

14. A pump as claimed in claim 13 wherein the locating member comprises an annular flange coaxial about the axis extending radially outwardly from the stem and supporting the guide tube with the guide tube extending inwardly therefrom.

15. A pump as claimed in claim 14 wherein: said piston forming element is generally cylindrical in cross-section with the stem comprising a central axially extending hollow stem having a central passageway open at an outer end forming an outlet and closed at the inner end; a circular head disc extending radially outwardly from the stem proximate the inner end, a circular base disc extending radially outwardly from the stem spaced axially outwardly from the head disc, the head disc having an edge portion proximate the chamber wall circumferentially thereabout engaging the chamber wall to prevent fluid flow therepast at least one of inwardly and outwardly; the base disc having an edge portion proximate the chamber wall circumferentially thereabout, the edge portion of the base disc engaging the chamber wall circumferentially thereabout to form a substantially fluid impermeable seal therewith on sliding of the piston forming element inwardly or outwardly, an inlet located on the stem between the head disc and the base disc in communication with the passageway via a short channel extending radially inwardly from the inlet to the passageway, the locating member secured to the stem radially outwardly of the head disc.

16. A pump as claimed in claim 1 wherein the locating member comprises an engagement member for engagement to slide the piston forming element coaxially relative the piston chamber.

17. A pump for dispensing fluids from a reservoir, comprising: a piston-chamber forming element having a chamber wall defining a cylindrical piston chamber therein bounded by a cylindrical, radially inwardly directed inner surface of the chamber wall, the chamber wall having an outer end defining an outer open end of the piston chamber, the piston chamber having an inner end in communication with the reservoir; the chamber wall having a cylindrical, radially outwardly directed outer guide surface, a piston forming element slidably received in the piston chamber extending outwardly from the open end thereof; said piston forming element being generally cylindrical in cross-section with a central axially extending hollow stem having a central passageway open at an outer end forming an outlet and closed at an inner end; a circular head disc extending radially outwardly from the stem proximate the inner end, the head disc having an edge portion proximate the chamber wall circumferentially thereabout, a circular base disc extending radially outwardly from the stem spaced axially outwardly from the head disc, the base disc having an edge portion proximate the chamber wall circumferentially thereabout, the edge portion of the base disc engaging the chamber wall circumferentially thereabout to form a substantially fluid impermeable seal therewith on sliding of the piston forming element inwardly, an inlet located on the stem between the head disc and the base disc in communication with the passageway via a short channel extending radially inwardly from the inlet to the passageway, a locating member secured to the stem radially outwardly of the head disc and having a guide wall which defines a guide chamber therein which extends to a rearwardly open end, the guide wall presenting a cylindrical, radially inwardly directed inner guide surface within the guide chamber, the chamber wall received within the guide chamber with the inwardly directed inner guide surface of the guide wall in coaxial, axially sliding engagement with the outwardly directed outer guide surface of the chamber wall to guide the piston-chamber forming element and the piston forming element in sliding axially, while maintaining the head disc centered and coaxially aligned within the piston chamber, wherein in any position of the piston in the piston chamber, the radially inwardly directed inner guide surface of the guide wall engaging with the radially outwardly directed outer guide surface of the chamber wall over an axial extent substantially equal to an axial extent the piston extends into the piston chamber.

* * * * *